April 10, 1945.    S. SCHNELL    2,373,505
YIELDABLE DEVICE
Filed Aug. 26, 1942    2 Sheets-Sheet 2
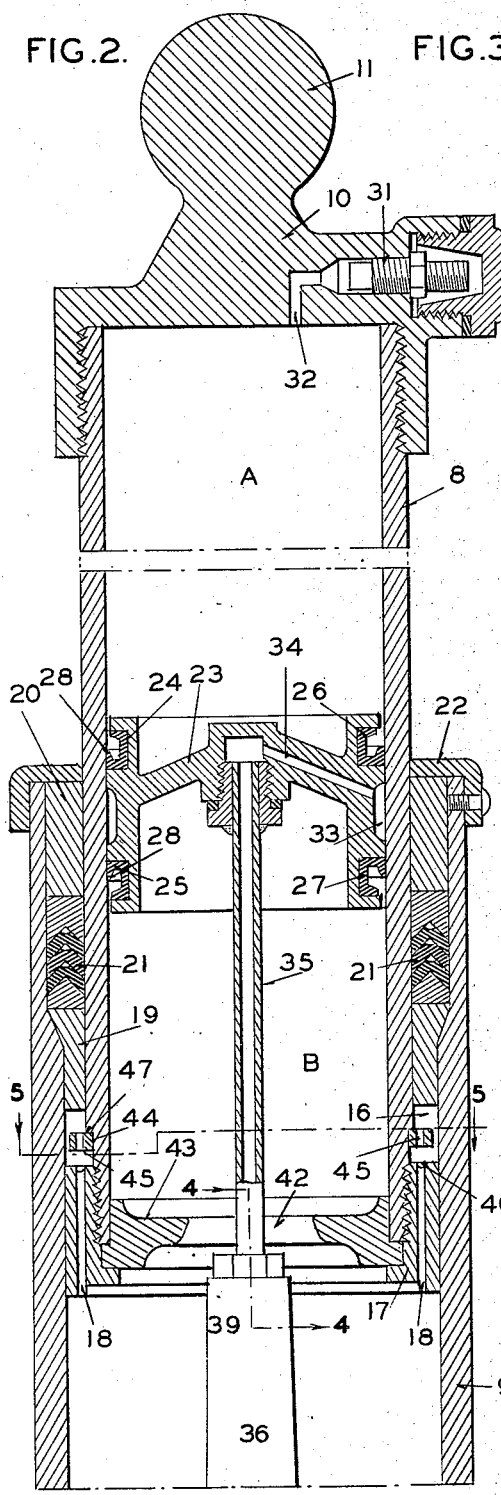
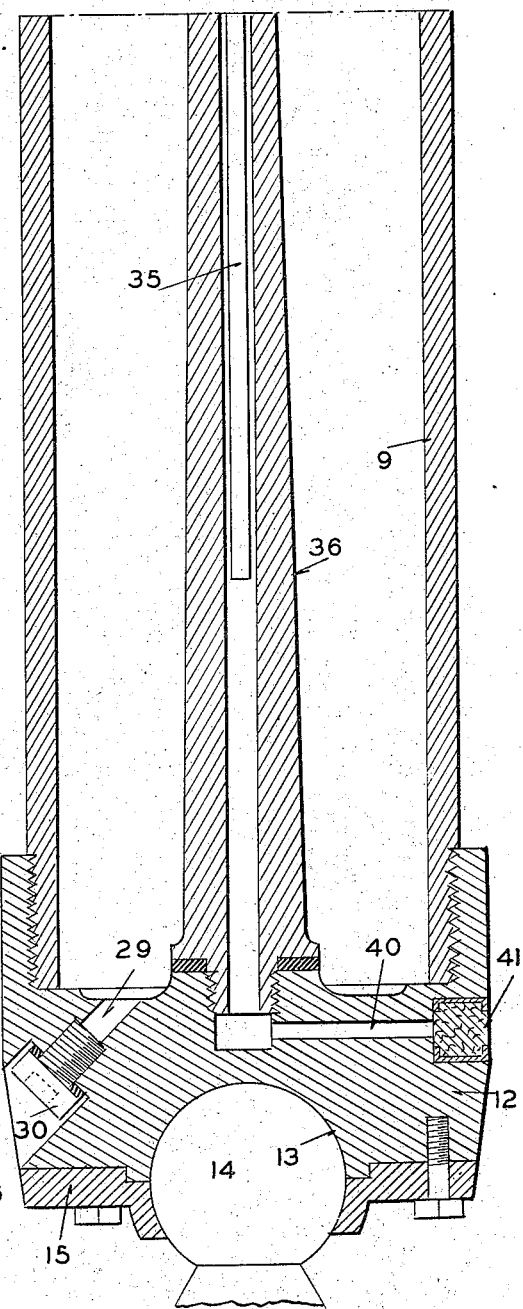
INVENTOR
S. SCHNELL
BY
*E. E. Huffman*
ATTORNEY Patented Apr. 10, 1945

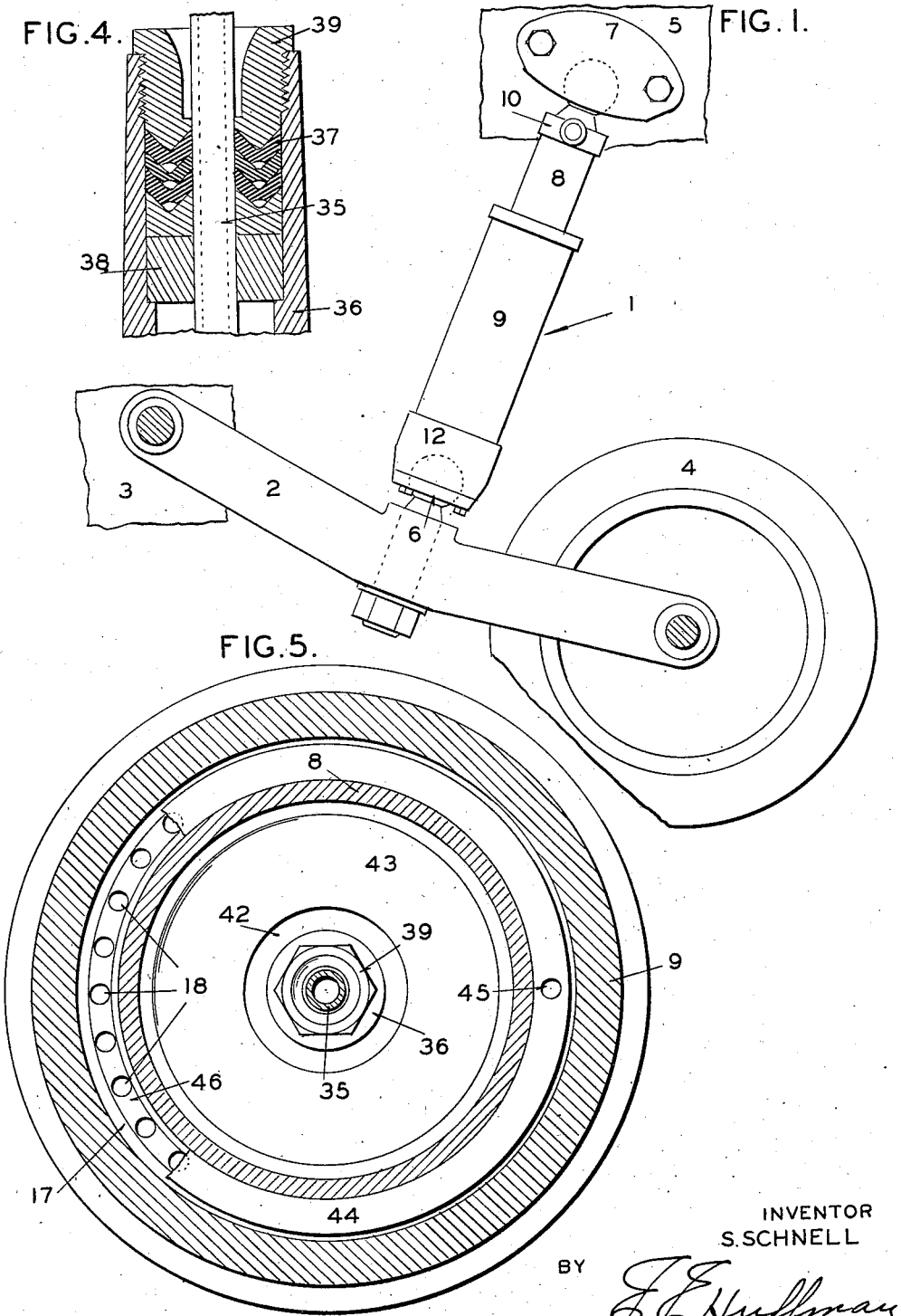

2,373,505

UNITED STATES PATENT OFFICE 2,373,505

YIELDABLE DEVICE

Steve Schnell, Kirkwood, Mo., assignor to Wagner Electric Corporation, St. Louis, Mo., a corporation of Delaware Application August 26, 1942, Serial No. 456,155

4 Claims. (Cl. 267—64)

My invention relates to improvements in devices having a movable piston separating two fluids under pressure such, for example, as in a yieldable device employed as a yieldable support, a suspension device, a rebound control device, a shock-absorbing device, an energy storing device, and the like, and which embodies a piston for separating fluids under pressure.

One of the objects of my invention is to provide in a device wherein a piston is employed to separate two fluids under pressure, means for insuring that the fluids will not become mixed and also that the pressures will be maintained at their desired value.

A more specific object of my invention is to produce an improved yieldable device which employs a piston to separate a gas and a liquid under pressure and wherein the piston is required to have considerable relative movement with respect to the cylinder in which it reciprocates.

Still another object of my invention is to produce an improved yieldable device which can be employed as a strut in supporting a vehicle and also function as a shock absorbing medium.

Other objects of my invention will become apparent from the following description taken in connection with the accompanying drawings in which Figure 1 is a view showing a yieldable device embodying my invention being employed as a strut between a vehicle wheel and the frame; Figures 2 and 3 are longitudinal sectional views of the upper and lower portions, respectively, of the strut, showing details thereof; and Figures 4 and 5 are sectional views taken on the lines 4—4 and 5—5, respectively, of Figure 2.

Referring to the drawings in detail and first to Figure 1, I have shown my improved yieldable device 1 employed, by way of example, as a strut between a wheel of a vehicle and the chassis or frame thereof. As shown in this figure, an arm 2 is pivoted at one end to a part of the frame 3 and its other end has rotatably mounted thereon a wheel 4. Between arm 2 and another frame part 5 of the vehicle there is interposed the device or strut 1, the connection being made by ball and socket connections 6 and 7.

The yieldable device or strut 1 is shown in detail in Figures 2, 3, 4, and 5, reference to which is now made. The strut is composed of two telescoping cylinders 8 and 9, the former being closed at its upper end by a cap 10 provided with a ball 11 forming part of the ball and socket connection 7 and cylinder 9 being closed at its lower end by a cap 12 provided with a socket 13 for receiving the ball 14 of the ball and socket connection 6, said ball being held in the socket by a plate 15. The external diameter of cylinder 8 is somewhat less than the internal diameter of cylinder 9, thus producing a chamber 16 between the walls of the two cylinders. The lower end of cylinder 8, which is received in cylinder 9, carries a sleeve 17 which has such an external diameter as to snugly fit in cylinder 9 so as to properly guide the lower end of cylinder 8. This sleeve is provided with a plurality of circumferentially spaced openings 18 for placing the chamber 16 in communication with the interior of cylinder 9 below the sleeve.

The upper end of cylinder 9 carries bearing sleeves 19 and 20 between which is interposed suitable annular packing means 21 to prevent fluid from leaking past the two cylinders yet permitting the cylinders to have relative axial movement. The bearing sleeves and packing means are held in position by a retaining cup 22 secured to the upper end of cylinder 9.

Within cylinder 8 is positioned a piston 23 for dividing the space within the two cylinders into two compartments A and B, the former being fully within the upper part of cylinder 8 and the latter within the lower part of cylinder 8 and cylinder 9. This piston is provided with axially spaced annular grooves 24 and 25 receiving annular packing cups 26 and 27, respectively, of general U-shaped radial cross-section with each having a sealing lip 28. The sealing lip of cup 26 faces toward chamber A and the sealing lip of cup 27 faces toward chamber B. Thus with fluid pressures in these chambers A and B, they will act upon the lips and aid in holding them against the cylinder wall to thus prevent fluid from passing the piston in either direction.

When the strut is in operating condition, chamber B is filled with a suitable non-compressible fluid such as oil, hydraulic brake fluid, or the like, and chamber A is filled with a compressible gas under pressure such as air. To fill chambers A and B the cylinders 9 and 10 are separated as far as possible and the strut turned upside down. Chamber B is now filled with the non-compressible fluid through the opening 29 normally closed by the plug 30. The piston, under these conditions, will assume a position engaging cap 10 either under its own weight or that plus the fluid. The volume of fluid placed in chamber B is predetermined and when this volume has been placed in the chamber, the other chamber A is filled with air under sufficient pressure to move the piston to slowly decrease the volume of chamber B. This air is placed in chamber A through air check valve 31 which controls inlet passage 32 in cap 10. When the piston has been so moved as to expel all air in chamber B, passage 29 is closed by the filler plug. The strut is now installed as shown in Figure 1 and additional air under pressure placed in chamber A. The pressure of the air in chamber A will be determined by the weight of the vehicle which is to be supported.

It is thus seen that when the strut is in operative condition with air in chamber A under predetermined pressure, the fluid in chamber B will also be under the same pressure since the piston only acts as a floating wall between the two fluids and prevents them from becoming mixed. When the vehicle is moving, cylinder 8 will move up and down in cylinder 9 as the wheel passes over any uneven surface. As this relative movement takes place, the volume of chamber 16 between the two cylinders will vary and the fluid in chamber B will flow in and out of this chamber 16. When cylinder 8 moves downwardly in cylinder 9, the piston will move upwardly relatively to cylinder 9 to compensate for the volume displaced by cylinder 8 as it moves into chamber B and thus the volume of chamber B remains constant.

It has been discovered that with the packing cup arrangement as described there will be some leakage past the piston as it moves relatively to cylinder 8 due to changing road conditions. The small amount of air or liquid which passes the packing cup will eventually fill the peripheral space between the packing cups indicated at 33 and attain the same pressure as that of the air in chamber A and the liquid in chamber B. When this occurs the sealing action of the lips of the cups will break down due to the fact that there is equal pressure on both sides of the lips. Consequently, due to the failure of these cups, air will finally become mixed with the liquid and the liquid will become mixed with the air and the two will not be maintained separated. After considerable operation of the strut, both chambers A and B will contain a foamy mixture of liquid and air. This, of course, is undesirable since the proper pressure conditions in the strut will not be maintained unless the two bodies of fluid are completely separated. To prevent this leakage from occurring past the cups and enable the cups to perform a continuous and efficient sealing action, I have discovered such can be accomplished by maintaining the annular space 33 between the cups at atmospheric pressure at all times. When this is done the fluid pressure in the chambers will act upon only one side of the lips of the cups and thus maintain them in sealing contact with the cylinder wall. To accomplish this the annular chamber 33 is connected by a duct 34 and by a tube to the atmosphere which includes a conduit 35 secured to the piston. This conduit extends downwardly through chamber B and is telescopically received in hollow pin portion 36 of the tube which is carried by the closure plug 12 on the lower end of cylinder 9 and extends upwardly through said cylinder. This pin has as its primary purpose to serve as part of a metering means for controlling the flow of fluid between that portion of chamber B which is contained in the lower part of cylinder 8 and the rest of said chamber which is in cylinder 9. The upper end of this pin 36 carries suitable packing rings 37 which surround the tube, said packing rings being held in position by a packing washer 38 and a threaded annular plug 39 screwed into the top of the pin. Thus by means of this seal liquid cannot pass out of chamber B yet the tube can reciprocate in the pin whenever the piston 23 moves relatively to cylinder 9 during the operation of the strut. Thus by means of the tube and its relationship to the pin the space between the sealing cups 25 and 26 will at all times be maintained under atmospheric pressure since the lower end of the hollow pin is connected to atmosphere by a passage 40 in the closure plug 12. To prevent foreign material entering the pin and tube, the passage 40 has a filter 41 associated therewith. Thus, regardless of the position that the piston may assume relative to the cylinder, space 33 between the packing cups will be maintained at atmospheric pressure and there will always be pressure acting on only one side of the lips of the cups to maintain them in proper sealing engagement with the cylinder wall.

The pin 36, which has been referred to as part of a metering means, has its external surface tapered and cooperates with a central opening 42 in a plate 43 carried by the lower end of cylinder 8. This opening is so related to the surface of the pin that when cylinder 8 is in its uppermost position the area of the opening between the pin and the wall of opening 42 will be a maximum and then as cylinder 8 moves downwardly relatively to cylinder 9, this area will be decreased. Thus it is seen that the opening 42 and the tapered pin form a metering means for varying the flow of fluid between the lower part of cylinder 8 and cylinder 9, which metering means will be controlled in accordance with the relative positions of cylinders 8 and 9. If there should be a tremendous pressure on the upper end of the strut, as would be the case when the weight of the vehicle comes down after it has passed over a depression or a "drop off," the passage of fluid from cylinder 8 to cylinder 9 would be metered and there would not be any tremendous flow of fluid as would be the case if the wall 43 and the metering pin and opening were not present. This metering of the flow of liquid produces a cushioning or shock absorbing effect since it results in the compression of the air in the chamber A at a slow rate.

In order that the cylinders 8 and 9 will be prevented from a too rapid separating movement there is associated with the plurality of circumferentially spaced passages 18, a ring 44 having therein two diametrically spaced openings 45 which can communicate with any of the openings 18 because of an annular groove 46 in the top of sleeve 17. Thus it is seen that if cylinder 8 attempts to move rapidly upwardly with respect to cylinder 9, the fluid in chamber 16 will cause ring 44 to become seated on the top of the sleeve and all the fluid passed out of chamber 16 must go through the two openings 45. By restricting the amount of fluid that can flow from chamber 16, the rapidity with which cylinder 8 can move upwardly with respect to cylinder 9 is controlled. When cylinder 8 moves downwardly with respect to cylinder 9, ring 44 cannot be effective to restrict the flow of fluid between cylinder 9 and chamber 16 as fluid can flow through all of passages 18 and around ring 44 as the ring will be pushed out of a position where it covers the upper ends of the passages, said position being shown in Figure 2. A shoulder 47 limits the upward movement of ring 44.

From the foregoing description it is seen that I have devised an improved yieldable device which although being shown as employed as a strut can be used wherever any yieldable device is required. With my improved device the con-compressible fluid and the compressible fluid under pressure will always be maintained separated since by means of my improvement the sealing cups of the separating piston will efficiently perform their sealing action at all times to prevent any interchange and mixing of this fluid of the chambers on either side of the piston. Also, by the arrangement shown the piston can have any desired relative movement with respect to the cylinder without the possibility of either chamber being placed in communication with the atmosphere to thereby change the predetermined conditions desired in the two chambers.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a yieldable device of the class described, two telescoping cylinders, a piston mounted in one cylinder for relative movement thereto, one cylinder provided with an apertured closure and the piston and apertured closure dividing the cylinders into three chambers with said piston as a floating wall between two of said chambers, a relatively non-compressible fluid in the chambers having the apertured closure therebetween, a compressible fluid under pressure greater than atmospheric pressure in the other chamber, said fluids in the chambers being maintained at all times by the floating piston at substantially equal pressures, axially spaced annular packing means carried by the piston and having sealing lips subject to the pressure of the fluid in the chambers, and means including a conduit having one end fixed to the piston for placing the space between the packing means in constant communication with the atmosphere and thus cause the lips to be held in pressure engagement with the contacted cylinder by the maximum pressure of the fluid acting thereon, a portion of said conduit means being exteriorly tapered and extending through said apertured closure for metering the flow of non-compressible fluid between the two cylinders therefor when said cylinders move relatively to each other.

2. In a yieldable device of the class described, two telescoping cylinders, a piston mounted in one cylinder for relative movement thereto, one cylinder provided with an apertured closure and the piston and apertured closure dividing the cylinders into three chambers with said piston as a floating wall between two of said chambers, a relatively non-compressible fluid in the chambers separated by the apertured closure, a compressible fluid under pressure greater than atmospheric pressure in the other chamber, said fluids in the chambers being maintained at all times by the floating piston at substantially equal pressures, axially spaced annular packing cups carried by the piston and each provided with a lip engaging the wall of the one cylinder with each body of fluid contacting the inner surface of a lip, means for placing the portion of the periphery of the piston lying between the packing cups in communication with the atmosphere to thus cause the lips to engage the cylinder wall by the maximum pressure of the fluid acting thereon, said means including a tube having one end movable with the piston and communicating with the piston portion, said tube having a tapered exterior over a portion of its length extending through said apertured closure regulating the flow of non-compressible fluid from one of said chambers to the other of the chambers having the non-compressible fluid therein, and means for placing the other end of the tube in communication with the atmosphere including means for sealing the tube but permitting it to have relative movement with respect to said cylinders.

3. In a yieldable device of the class described, two telescoping cylinders, a piston mounted in one cylinder for relative movement thereto and dividing the cylinders into two chambers, a relatively non-compressible fluid in one of the chambers, a compressible fluid under pressure in the other chamber, axially spaced annular packing cups carried by the piston, a wall carried by the telescoped end of the cylinder in which the piston is mounted and having a central opening, a hollow pin carried by the other cylinder with its interior communicating with the atmosphere and adapted to be received in the wall opening for metering the flow of the non-compressible fluid between the two cylinders when relative movement takes place, a tube connected with the piston and telescoped in the hollow pin, and means for placing the portion of the periphery of the piston which lies between the packing cups in communication with the tube.

4. In a yieldable device of the class described, two telescoping cylinders with the external diameter of the inner less than the internal diameter of the outer, sealing means for the cylinders, a piston mounted in one cylinder for relative movement thereto and dividing the cylinders into two chambers, a relatively non-compressible fluid in one of the chambers, a compressible fluid under pressure in the other chamber, axially spaced annular packing cups carried by the piston, a wall carried by the telescoped end of the cylinder in which the piston is mounted and having a central opening, a hollow tapered pin carried by the other cylinder with its interior communicating with the atmosphere and adapted to be received in the wall opening for metering the flow of the non-compressible fluid between the two cylinders when the cylinders move relatively toward each other, means for restricting the flow of fluid from the space between the cylinder walls when the cylinders move relatively away from each other, a tube connected with the piston and telescoped in the hollow pin, a seal between the tube and pin, and conduit means in the piston body for placing the portion of the periphery of the piston which lies between the packing cups in communication with the tube.

STEVE SCHNELL.